United States Patent
Cheng et al.

(10) Patent No.: US 9,357,161 B1
(45) Date of Patent: May 31, 2016

(54) MOTION VECTOR INTERPOLATION FOR MOTION COMPENSATION

(75) Inventors: Guohua Cheng, Shanghai (CN); Neil D. Woodall, Newport Beach, CA (US); Bob Zhang, Santa Clara, CA (US); Xiaojie Sheng, Shanghai (CN)

(73) Assignee: Pixelworks, Inc., Portland, OR (US)

( * ) Notice: Subject to any disclaimer, the term of this patent is extended or adjusted under 35 U.S.C. 154(b) by 326 days.

(21) Appl. No.: 13/275,263

(22) Filed: Oct. 17, 2011

(51) Int. Cl.
H04N 7/00 (2011.01)

(52) U.S. Cl.
CPC ....................................... *H04N 7/00* (2013.01)

(58) Field of Classification Search
CPC ....................................................... H04N 7/014
USPC ............................. 375/240.01, 240.16, 240.24
See application file for complete search history.

(56) References Cited

U.S. PATENT DOCUMENTS

| | | | | |
|---|---|---|---|---|
| 7,197,074 | B2 * | 3/2007 | Biswas et al. | 375/240.16 |
| 7,852,375 | B2 * | 12/2010 | Vella et al. | 348/208.99 |
| 8,233,730 | B1 * | 7/2012 | Namboodiri et al. | 382/236 |
| 8,289,444 | B2 * | 10/2012 | Zhou et al. | 348/441 |
| 8,477,848 | B1 * | 7/2013 | Patankar et al. | 375/240.16 |
| 2008/0186386 | A1 * | 8/2008 | Okada et al. | 348/208.4 |
| 2008/0317127 | A1 * | 12/2008 | Lee et al. | 375/240.16 |
| 2009/0060041 | A1 * | 3/2009 | Lertrattanapanich et al. | 375/240.16 |
| 2009/0147851 | A1 * | 6/2009 | Klein Gunnewiek et al. | 375/240.16 |
| 2009/0278991 | A1 * | 11/2009 | Freiburg et al. | 348/699 |
| 2010/0045856 | A1 * | 2/2010 | Chappalli et al. | H04N 7/014 348/441 |
| 2010/0066914 | A1 * | 3/2010 | Sato | 348/699 |
| 2010/0091858 | A1 * | 4/2010 | Yang | 375/240.13 |
| 2011/0075027 | A1 * | 3/2011 | Wu et al. | 348/452 |
| 2011/0249188 | A1 * | 10/2011 | Cheng et al. | H04N 5/145 348/699 |

* cited by examiner

*Primary Examiner* — Sath V Perungavoor
*Assistant Examiner* — Jeffery Williams
(74) *Attorney, Agent, or Firm* — Marger Johnson

(57) ABSTRACT

A method of performing motion compensation includes identifying a set of candidate motion vectors for a block in an intermediate frame from a set of motion vectors from a previous and current frames, performing block-level analysis for each candidate motion vector, selecting an interpolation motion vector, and using the interpolation motion vector to interpolate the intermediate frame between the previous and current frames, wherein the number of intermediate frames depends upon a conversion to a faster frame rate. A method of determining background and foreground motion vectors for a block in an interpolated frame includes comparing a first motion vector that points to a previous frame to a second motion vector that points to a next frame to produce a difference, and designating one of the first and second motion vectors as a background motion vector and the other as a foreground motion vector depending upon the difference.

23 Claims, 13 Drawing Sheets

⊘ hitmv_cf[min_index]
○ hitmv_p1[min_index]
□ hitmv_cfbak[min_index]
▦ hitmv_cfbak[index_bak]

⊘ hitmv_cf[min_index]
○ hitmv_p1[min_index]
□ hitmv_p1bak[min_index]

MOTION VECTOR INTERPOLATION FOR MOTION COMPENSATION

BACKGROUND

Frame interpolation creates an image frame from neighboring images. The neighboring images may be fields in an interlaced video format, used to form a frame of data, or neighboring frames of a soon-to-be-created frame. Typically, frame interpolation has the goal of increasing the number of frames. For example, one may desire to convert from a 24 frame per second rate, such as in film, to 120 frames per second for a video display device such as a liquid crystal display.

In the simplest approach, one could increase the frame rate by repeating the most recent frame until the next frame is ready for display. However, this does not account for moving objects which may appear to jump from frame to frame and have flickering artifacts. Motion estimation and motion compensation techniques may alleviate some of these issues. These techniques rely upon motion vectors to shift the image data for the moving object to the correct position in interpolated frames, thereby compensating for the motion of the object.

In the above example of converting from 24 frames per second to 120 frames per second, current approaches perform motion estimation for each interpolated phase. For example, the process would calculate the motion vector field at phases 0, 0.2, 0.4, 0.6 and 0.8 between the successive input frames to convert up to 120 frames per second. This consumes both time and computing resources, making the process slow and fairly hardware intensive. This becomes even more problematic for higher frame rates, such as 240 frames per second.

DETAILED DESCRIPTION OF THE EMBODIMENTS

Figure 1:
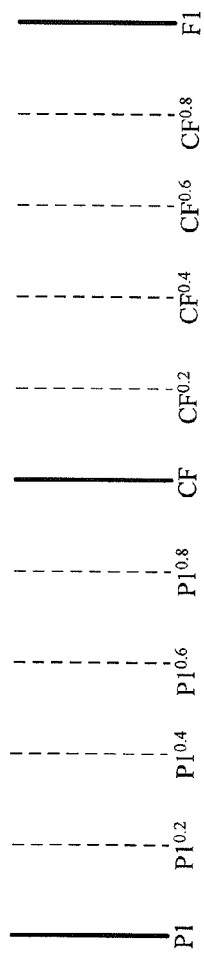
FIG. 1 shows a graphical representation of a current approach to determining motion vector fields for an increase frame rate.

FIG. 1 shows a conventional frame rate conversion to a faster frame rate, sometimes referred to as an up conversion. The illustrated method of FIG. 1 calculates a motion vector field for each of the indicated phases. This entails a large number of calculations and additional time. The motion vector fields are calculated between the previous frame P1, the current frame CF and the future frame F1 several times.

Figure 2:
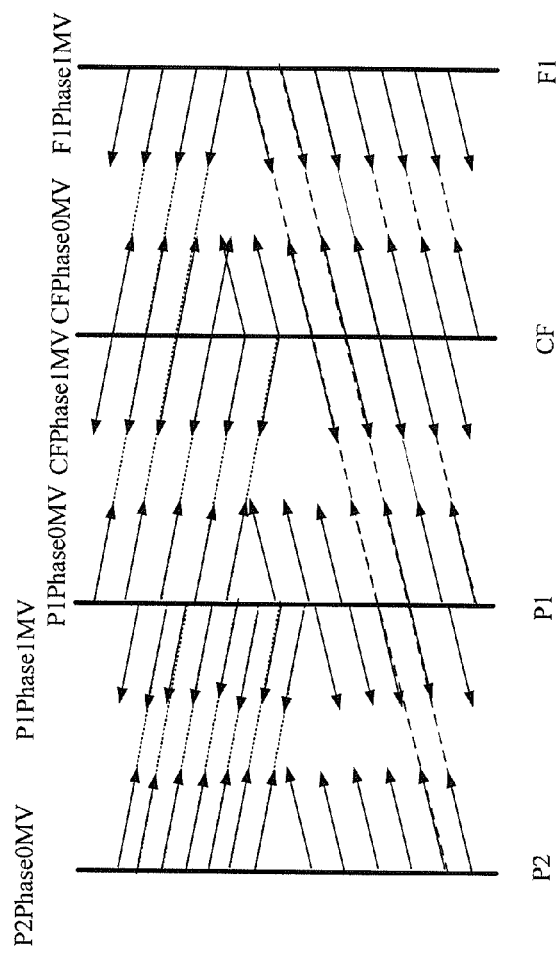
FIG. 2 shows a graphical representation of an embodiment of determining motion vector fields for an increased frame rate.

In contrast, embodiments described here only calculate the motion vector field for the original frame from the previous frame and the future frame. As will be discussed in more detail, the next most previous frame P2 may also be used. As shown in FIG. 2, the process divides the image into block and then estimates the motion vector for each block in the current frame based upon the previous frame, denoting it as the phase one motion vector (MV) field, such as CFPhase1MV. The process also estimates the motion vector for each block on the current frame based upon the future frame, denoting it as the phase zero MV field, such as CFPhase0MV. After motion estimation, each interpolated frame has two MV fields, phase one MV calculated from the previous frame and phase zero MV calculated on the future frame.

Figure 3:
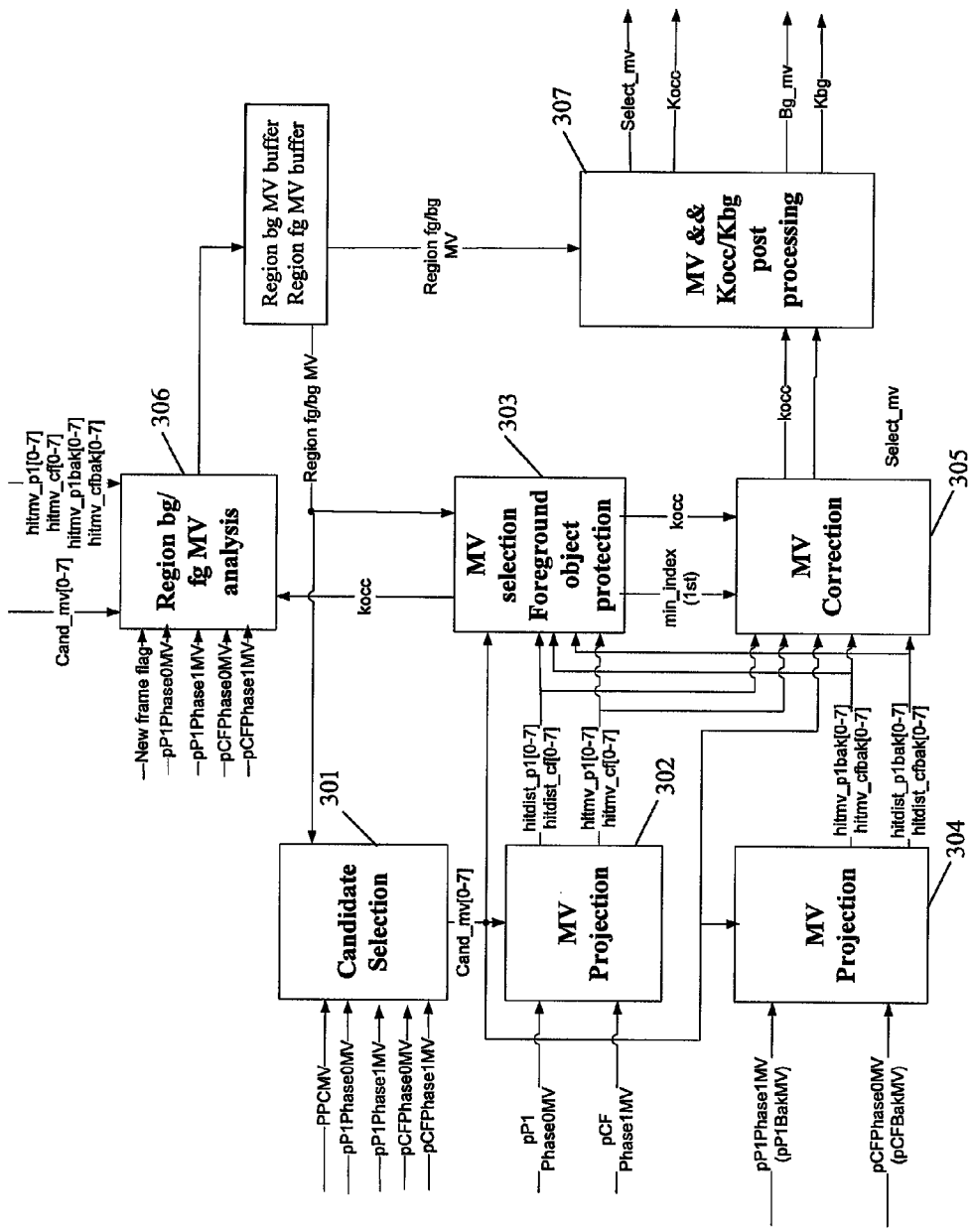
FIG. 3 shows an embodiment of a processor used for motion vector interpolation.

FIG. 3 provides an overview of the process of reconstructing the MV field at the interpolated phase for frame rate up conversion. The modules of FIG. 3 may consist of software modules running on a processor, hardware circuitry for each module or group of modules, or a mixture. Generally, the candidate selection module 301 receives the MV fields being used for a particular block in the current frame, such as P1Phase0MV, as well as the phase plane correlation motion vector (PPCMV). The module then selects a number of candidate motion vectors. In this current embodiment, the module selects 8 candidate motion vectors.

Modules 302 and 304 project the candidate motion vectors to the zero and one phase MV fields and then get a measurement for each candidate. Using block-level analysis, discussed in more detail below, module 303 selects the closest candidate from the number of candidate motion vectors and performs cover/uncover detection. Cover/uncover detection involves determining the regions, if any, in which a moving object either covers something that was previously uncovered, or uncovers background that was previously covered. The regions in which this occurs are referred to as occluded regions. The MV for these regions may need correction to account for the motion, performed by module 305 in this embodiment. Module 306 analyzes the regional background and foreground MVs, and module 307 performs post-processing and refinement for the output MV, the background MV, a confidence measure of the occlusion determination and a confidence measure of the foreground/background detection result. The selected interpolation motion vector is then used to interpolate intermediate frames between the previous frame and the next frame, where the number of intermediate frames depends upon the conversion from the first rate to a faster frame rate.

As mentioned above, the MV interpolation between the previous frame P1 and the current frame CF may occur in one of two modes. In a normal mode, the process uses P1Phase1MV, P1Phase0MV, CFPhase1MV and CFPhase0MV. In a low frame delay mode, the process uses P2Phase0MV, P1Phase1MV, P1Phase0MV and CFPhase1MV. The low frame delay mode has less delay between the input and the display of an image frame because it does not have to wait for the future frame to arrive. In normal mode, the future frame is used for CFPhase0MV.

Figure 4:
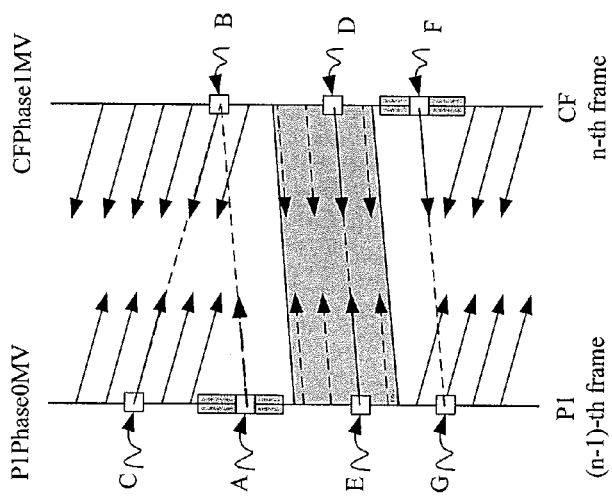
FIG. 4 shows a graphical representation of motion vectors between phases.

The process has different strategies for occluded regions and normal regions. By checking the MV field, occluded regions can be detected. FIG. 4 shows an example of occluded and normal regions. In FIG. 4, blocks B, C and D, E are in the normal region. In the normal region, the motion vectors from P1Phase0MV, such as those projected from blocks C and E hit at blocks B and D in CFPhase1MV. The motion vectors projected in the opposite direction 'match' in that the motion vector from B projects to C and the motion vector from D projects to, or 'hits,' block E. These may be referred to as 'double confirmed.' All of the motion vectors in the gray region surrounding blocks D and E are double confirmed.

However, if one looks at blocks F and A, one can see the issue. Block A has a motion vector that projects to block B in CFPhase1MV, but block B's motion vector projects to C. The object shown around block A has moved to the position surrounding block F. Similarly, the motion vector of block F projects to block G in P1Phase0MV, but block G's motion vector projects in a different direction, not towards block F. The motion vectors for blocks G and B may be referred to as a 'hit' MV. These regions may be occluded regions, as further processing will determine.

To quantify the difference between the current MV and the hit MV in the other phase, the process has defined a measurement:

$$P1Phase0MV[A].mvdiff=abs(P1Phase0MV[A].x-CFPhase1MV[B].x)+abs(P1Phase0MV[A].y-CFPhase1MV[B].y)$$

In this measurement, B is the hit block by MV of block A. A small mvdiff value means that the motion vector in one phase and its projected motion vector in the other phase are close to each other and double confirmed. A large mvdiff value means they cannot match. The mvdiff value will be small for normal regions, and large for occluded regions. At the same time, the process can use the mvdiff value to measure the reliability of the MV, an MV with smaller mvdiff will be more reliable. Also, in MV interpolation the sum absolute difference (SAD) value provides a measure of the reliability of the MV. It measures the sum absolute difference of two matching blocks according to the MV.

Returning to the selection of candidate motion vectors, one could project all of the MVs of P1Phase0MV and CFPhase1MV to the interpolated phase and select the one having the closest one of some sort of measurement. However, because of the occlusion problem, it may cause a hole in the MV field because some blocks in the interpolated phase may not be hit by an MV. In one embodiment, the process selects 8 candidate motion vectors for a block. The process selects the candidates to ensure coverage of different kind of MVs.

The candidate motion vectors will be noted as cand_mv[i], where i in this instance is from 0-7. First, two spatial MVs, the MVs of top left and top right block of current block from the current phase were selected. Since the current block and its spatial neighbor blocks may belong to same object. Two MVs from the regional background/foreground MV are selected if the regional MV is reliable. The process then selects two MVs from the corresponding block in P1Phase0MV and CFPhase1MV. Finally, two MVs are selected from P1Phase1MV, also referred to as P1BakMV, and CFPhase0MV, also referred to as CFBakMV, in corresponding 3×3 blocks. The 3×3 blocks have maximal difference with the MV from P1Phase0MV and CFPhase1MV.

In the low frame delay mode CFPhase0MV is not available, so the last candidate motion vector is selected from P1Phase0MV that has the maximal difference from the other MV from that phase.

After selection of the candidate motion vectors, the similarity between them is determined. If necessary, the process will replace those that are too similar to other candidates with the PPCMV. In one embodiment the PPCMV may be two dominant MVs from a current phase plane correlation block.

Figure 5:
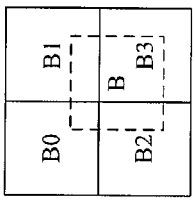
FIG. 5 shows a graphical representation of a motion vector projection and measurement.
Figure 5:
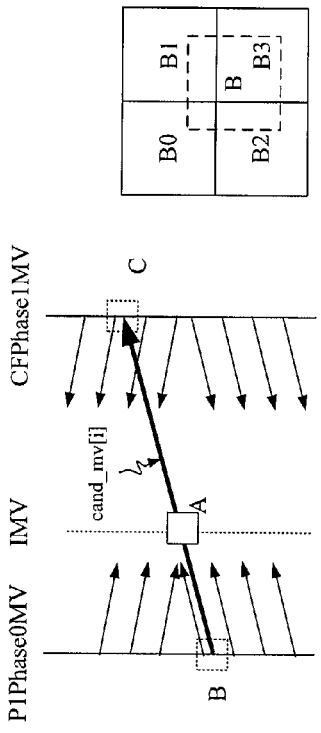

All of the candidate MVs will project to the P1Phase0MV and CFPhase1MV fields to check their fitness at the current block by module 302 from FIG. 3. Referring to FIG. 5, the block A in the interpolated phase MV field uses its i-th candidate MV, cand_mv[i] to project to the two phases. In the example, the MV from A hits block B in P1Phase0MV and block C in the CFPhase1MV field. B may not align with block grid, as shown to the right, and may consist of portions of blocks B0, B1, B2 and B3. By performing bilinear interpolation, the process can get B's MV with neighboring four blocks' MV, and label this MV with hitmv_pl[i]. At the same time, the process compares the difference of hitmv_pl[i] with i-th candidate MV cand_mv[i] and finds the hit distance:

$$hitdist\_pl[i]=abs(cand\_mv[i].x-hitmv\_pl[i].x)+abs(cand\_mv[i].y-hitmv\_pl[i].y).$$

With the same technique, the process can get the hit MV in CFPhase1MV and MV difference hitmv_cf[i] and hitdist_cf[i].

In module 306, the process analyzes the regional background and foreground. First, each block in the P1Phase0MV and CFPhase1MV fields are analyzed to check whether a stable background/foreground MV can be found. Second, each block in the IMV field is analyzed to complement the detection in the P1Phase0MV and CFPhase1MV fields. All the detected background/foreground MVs are stored into a buffer for regional background/foreground MV calculation. After the above analyses, the process divides the frame into several regions and calculate the average background/foreground MV for each region as the regional background/foreground MV. Background/foreground MV detection only occurs when a new frame appears. The regional background and foreground MV is buffered and only updated when a new frame flag is detected.

Figure 6:
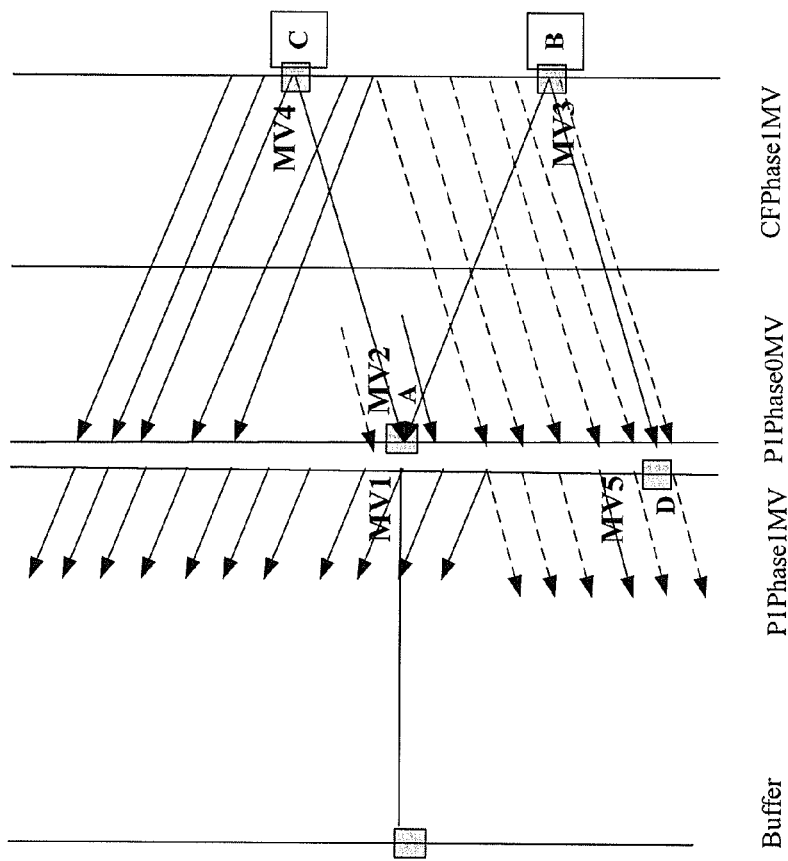
FIG. 6 shows a graphical representation of background and foreground analysis for a cover region.

As mentioned above, the process performs an analysis of the background/foreground information in P1Phase0MV and CFPhase1MV field, as shown in FIG. 6. For every block in P1Phase0MV field such as Block A, the process gets two motion vectors MV1 and MV2 from P1Phase1MV and P1Phase0MV separately. If MV2.mvdiff is much larger than MV1.mvdiff, Block A is considered to be in a candidate cover region and take MV1 as a candidate background MV.

MV2 at this point is assumed to be wrong and because different areas of the same object are usually more similar than areas between the background and foreground, it is therefore more likely that MV2 points to a portion of the background than the foreground. To confirm this the process compares MV1 and MV4 to see if they are similar. The process uses the assumed correct MV for the background to project to block B and check to see if the MV for that block (MV3) is consistent with a foreground MV by comparing to MV5.

To confirm whether MV1 is a stable background MV, the process uses the following MVs to check it, referring to FIG. 6. MV1 projects from block A to CFPhase1MV and gets MV3 at block B. MV3 projects from block A to CFPhase1MV and gets MV4 at block C. MV3 projects from block B to P1Phase1MV and get MV5 at block D. This leads to the following calculations:

dist_*t0*=*abs*(MV1.*x*−MV3.*x*)+*abs*(MV1.*y*−MV3.*y*);

dist_*t1*=*abs*(MV3.*x*−MV5.*x*)+*abs*(MV3.*y*−MV5.*y*);

dist_*t2*=*abs*(MV1.*x*−MV4.*x*)+*abs*(MV1.*y*−MV4.*y*);

MV1 is designated as a stable background MV if following criteria are met:
dist_t0>2*max(dist_t1+dist_t2, THR1);
MV1.mvdiff<THR2;
MV2.mvdiff>MV1.mvdiff+THR3;
MV1.sad<=min(1,MV2.sad);
max(MV3.mvdiff, MV5.mvdiff)<THR4.

MV3 is then taken as the stable foreground MV. The background and foreground MVs are then stored in a buffer in the block A position of the background/foreground MV buffer as shown in FIGS. 6 and 3. The process also sets a flag to indicate that the background/foreground is found in the block A position.

Figure 7:
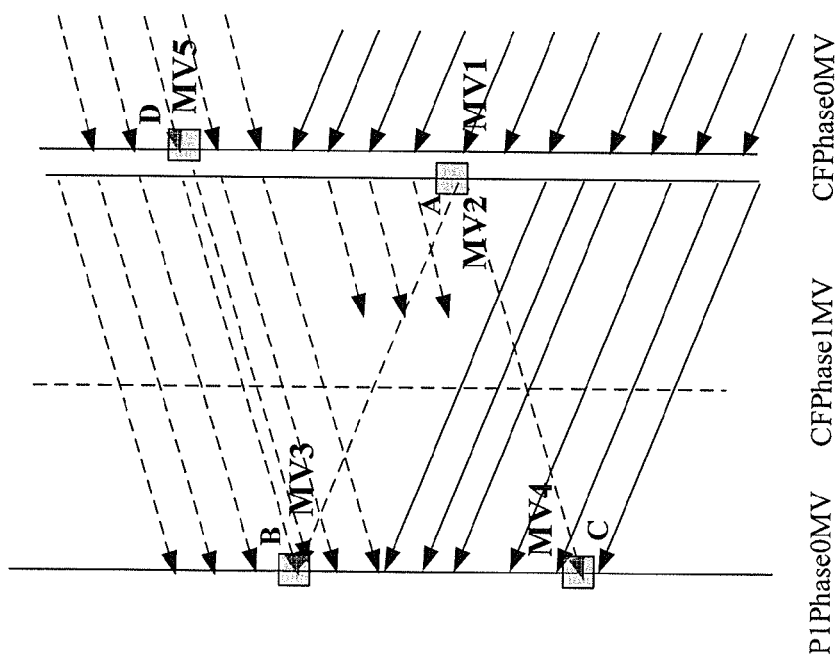
FIG. 7 shows a graphical representation of background and foreground analysis for an uncover region.

For the cover situation, since the CFPhase0MV field is not used, the process is the same between the normal mode and the low frame delay mode. For normal mode in uncover situation, process is similar to the cover regions. Referring now to FIG. 7, for every block in the CFPhase1MV field (Block A), the process will check whether the detection flag is set at the position A during the cover analysis. If so, the process continues to the next block.

If the flag is not set, the process continues on to get two motion vectors in the CFPhase0MV and the CFPhase1MV as MV1 and MV2 shown in FIG. 7. If MV2.mvdiff is much larger than MV1.mvdiff, the process considers the Block A to be in a candidate uncover region and takes MV1 as a candidate background MV. Confirmation of MV1 as a stable background MV uses the following MVs. MV1 projects from block A to P1Phase0MV and gets MV3 at block B. MV3 projects from block A to P1Phase0MV and gets MV4 at block C. MV3 then projects from block B to CFPhase0MV and gets MV5 at block D.

The confirmation logic is the same as cover situations. If the background/foreground MV is confirmed, the process will also save the background/foreground MV in the block A position of the buffer and set a flag to indicate background/foreground is found in the A position.

Figure 8:
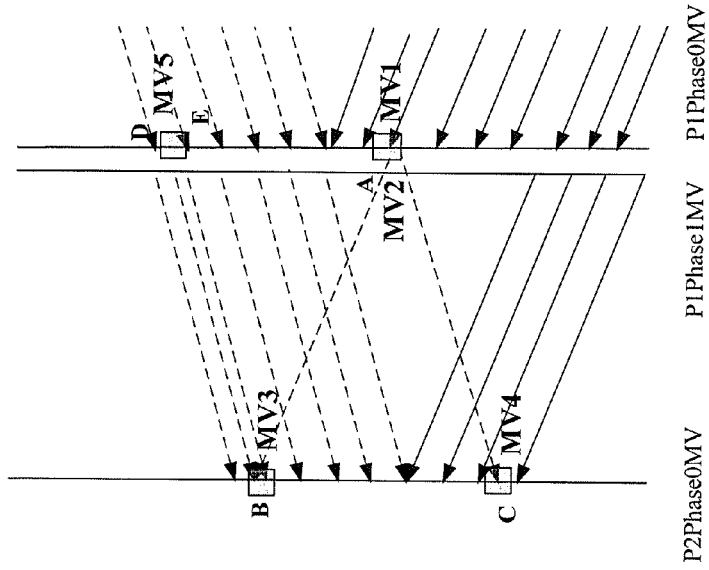
FIG. 8 shows a graphical representation of background and foreground analysis in a low frame delay mode.

In the low frame delay mode, CFPhase0MV is not available. In this condition, the strategy for background/foreground MV detection in the uncover situation differs. FIG. 8 shows the details. The only difference lies in the background/foreground detection in the P2Phase0MV, P1Phase0MV, P1Phase1MV fields in low frame delay mode.

After the process analyzes the background/foreground MV in P1Phase0MV and CFPhase1MV fields, it also analyzes the IMV. Background/foreground analysis in IMV complements the analysis in the P1Phase0MV and CFPhase1MV fields which means, for each block in IMV, the process will first check the background/foreground buffer and the state of the detection flag, if it is already set at the position of current block during the analysis in P1Phase0MV and CFPhase1MV fields. If the flag is not set at the block, the process continues to analyze the block in the IMV. Otherwise, the process continues to check the next block in the IMV.

Figure 9:
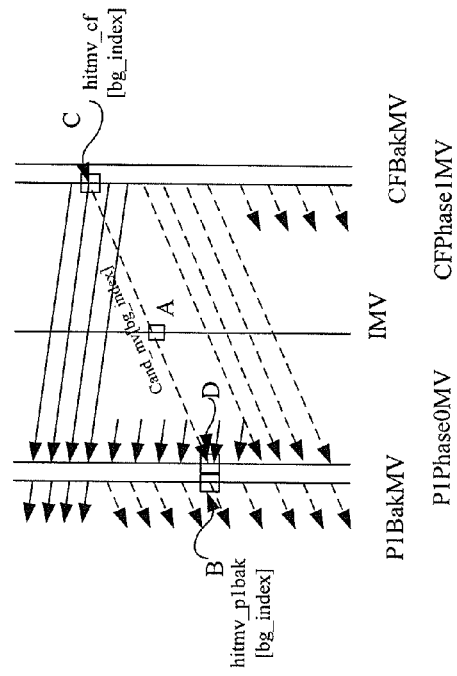
FIG. 9 shows background and foreground motion vector analysis in a cover region.

FIG. 9 illustrates the background/foreground MV analysis in the cover region (kocc>0). The kocc value comes from module 303 in FIG. 3. The detection at block A in IMV is based on P1Phase0MV, P1Phase1MV and CFPhase1MV. First the process searches a cand_mv[bg_index] by finding a cand_mv[bg_index] closer to hitmv_plbak[bg_index], where hitmv_plbak[bg_index] differs from hitmv_cf[bg_index].

To select the best one from eight candidate MVs, the process defines the following values for each candidate MV:

dist_*t0*[*k*]=*abs*(cand_mv[*k*].*x*−hitmv_*plbak*[*k*].*x*)+ *abs*(cand_mv[*k*].*y*−hitmv_*plbak*[*k*].*y*);

dist_*t1*[*k*]=*abs*(hitmv_*plbak*[*k*].*x*−hitmv_*cf*[*k*].*x*)+ *abs*(hitmv_*plbak*[*k*].*y*−hitmv_*cf*[5].*y*); and

*bgmv*cost[*k*]=dist_*t1*[*k*]−dist_*t0*[*k*].

The process selects the one with maximal bgmvcost value as the candidate background MV, and labels the index a bg_index. The process then checks it again according to the mvdiff value to make sure the background and foreground MV are reliable ones. If following conditions met, the process takes block B's MV (hitmv_plbak[bg_index]) as the background MV and take block C's MV (hitmv_cf[bg_index]) as the foreground M. These are then saved in the same position as block A in the background/foreground MV buffer and a flag is set to indicate that the background/foreground MV is found. The conditions are:

hitmv_*pl*[*bg*_index].mvdiff>hitmv_*plbak* [*bg*_index].mvdiff+*THR*1;

hitmv_*pl*[*bg*_index].mvdiff>hitmv_*cf* [*bg*_index].mvdiff)+*THR*1;

hitmv_*plbak*[*bg*_index].mvdiff<*THR*2;

hitmv_*cf*[*bg*_index].mvdiff<*THR*2; and

*bgmv*cost[*bg*_index]>*THR*3.

Figure 10:
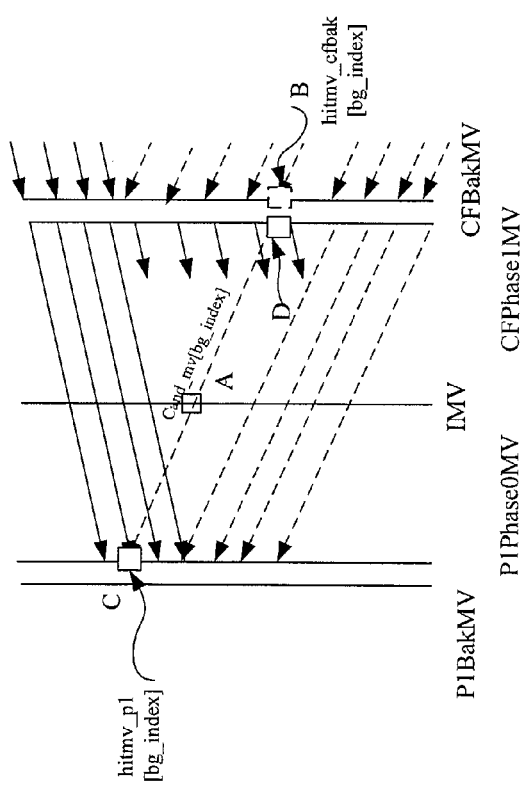
FIG. 10 shows a background and foreground motion vector analysis in an uncover region.

FIG. 10 illustrates the background/foreground MV analysis in the uncover region (kocc<0). The detection at block A in IMV is based on P1Phase0MV, CFPhase1MV and CFPhase0MV. The process searches for a cand_mv[bg_index] that is hitmv_cfbak[bg_index], where hitmv_cfbak[bg_index] differs from hitmv_pl[bg_index]. To select the best one from eight candidate MVs, the process defines the following values for each candidate MV:

dist_*t0*[*k*]=*abs*(cand_mv[*k*].*x*+hitmv_*cfbak*[*k*].*x*)+ *abs*(cand_mv[*k*].*y*−hitmv_*cfbak*[*k*].*y*);

dist_*t1*[*k*]=*abs*(hitmv_*cfbak*[*k*].*x*−hitmv_*pl*[*k*].*x*)+ *abs*(hitmv_*cfbak*[*k*].*y*.−hitmv_*pl*[*k*].*y*); and

*bgmv*cost[*k*]=dist_*t1*[*k*]−dist_*t0*[*k*].

The process selects the one with maximal bgmvcost value as the potential background MV, and labels the index with bg_index. The process then checks it again according to the mvdiff value to make sure the background and foreground MV are reliable MV. If the following conditions are met, the process takes block B's MV (hitmv_cfbak[bg_index]) as the background MV and take block C's MV (hitmv_pl[bg_index]) as the foreground MV. The process then saves them in the same position as block A in the background/foreground MV buffer and sets a flag to indicate the background/foreground MV is found. The conditions are:

hitmv_cf[bg_index].mvdiff>hitmv_cfbak [bg_index].mvdiff+THR1;

hitmv_cf[bg_index].mvdiff>hitmv_pl [bg_index].mvdiff)+THR1;

hitmv_cfbak[bg_index].mvdiff<THR2;

hitmv_pl[bg_index].mvdiff<THR2; and bgmvcost[bg_index]>THR3.

In one embodiment THR1, THR2 and THR3 are set empirically.

In low frame delay mode, the CFPhase0MV is not available. The process does not perform the background/foreground MV detection in the uncover region of IMV. The detection in cover region is the same as the normal mode.

Figure 11:
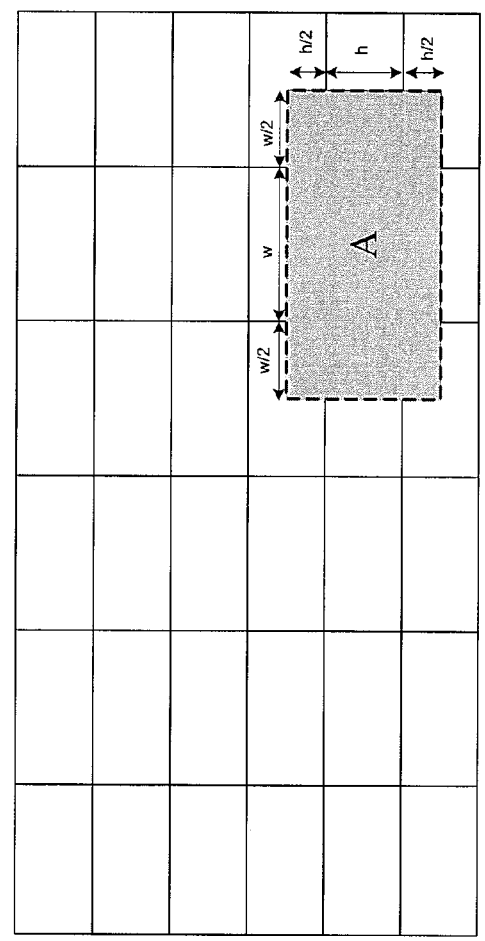
FIG. 11 shows an example of a region used in determining a regional background and foreground motion vector.

After the background/foreground analysis in P1Phase0MV and CFPhase1MV and IMV fields, the process calculates the regional background/foreground MV for the whole image as shown in FIG. 11.

The process divides the whole image into some regions by equally dividing the height and width of the image. The number of regions can be from 2*2 to 16*16. For each region, the process accumulates all background/foreground MVs that are detected above in a larger region, referred to as the overlapped region, which is two times higher and wider than the original part. For example, for region A, the process accumulates the detected background/foreground MVs in the shaded region, the overlapped region.

To accumulate the detected background/foreground MVs, the process checks the background/foreground buffer, if the detection flag is set for a block in the overlapped region, the background/foreground MV stored at the block will be accumulated. The average value of all the detected background/foreground MV in the overlapped region is calculated as regional background/foreground MV for the current region.

Returning to FIG. 3, once the process acquires the hit distance and hit MVs from each candidate in module 302, and the regional background/foreground MV, it then selects the best MV. The best MV in this embodiment is that which has the minimal hit distance in module 303. The process also encourages selection of the foreground MV according to the regional foreground/background information, the encouragement involves a weighting.

Figure 12:
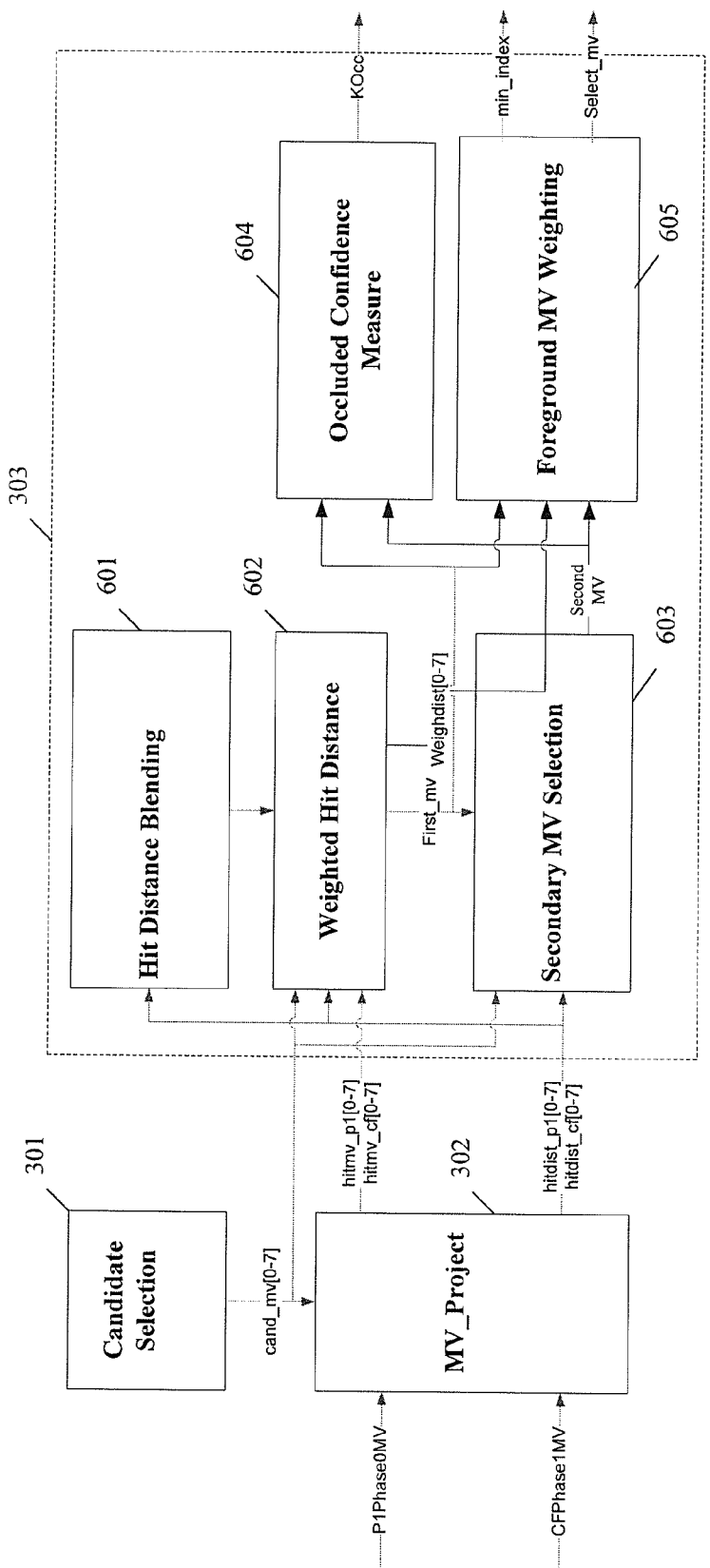
FIG. 12 shows an expanded embodiment of a motion vector selection module.

FIG. 12 shows a portion of the apparatus from FIG. 3, with an expanded embodiment of the MV Selection module 303. Module 601 calculates the blending weight kl used to blend hitdist_pl[i] and hitdist_cf[i]. The process calculates the minimal hit distance in the P1 and CF sides respectively, and gets mindist_pl and min_dist_cf.

mindist_pl=min(hitdist_pl[i],i∈[0,7]);

mindist_cf=min(hitdist_cf[i],i∈[0,7]).

The process then gets a weight kl according to mindist_pl and mindist_cf. The kl value will be sent to module 602.

Module 602 calculates the weighted hit distance as following for each candidate MV:

weightdist[i]=hitdist_pl[i]+(64−kl)*(hitdist_cf[i]−hitdist_pl[i])/64.

The module then selects the candidate which has the minimal weightdist as the first_mv, and the index for this candidate is labeled as $1^{st}$.

Module 603 selects another MV from the eight candidates that meets the conditions of being different from first my, and has a small hit distance with P1Phase0MV or/and CFPhase1MV, or close to hitmv_pl[$1^{st}$] or hitmv_cf[$1^{st}$]. The selected MV in module 603 is denoted with second_mv, and the index for this candidate MV is labeled as $2^{nd}$.

Module 604 determines the confidence for cover/uncover (Kocc) according to the mvdiff value of first_mv and second_mv. The first and second MV are selected according to weightdist, to protect the foreground object. Module 605 encourages selection of the foreground MV according to regional background/foreground analysis result described previously. The process first checks if the current block belongs to which region and gets the corresponding regional background/foreground MV as regbg_mv and regfg_mv. The process then separately calculates the distance between first/second MV and regional background/foreground MV as follows:

dist_1st_regfg=(abs(first_mv.x−regfg_mv.x)+ abs(first_mv.y−regfg_mv.y));

dist_2nd_regfg=(abs(second_mv.x−regfg_mv.x)+ abs(second_mv.y−regfg_mv.y));

dist_1st_regbg=(abs(first_mv.x−regbg_mv.x)+ abs(firstmv.y−regbg_mv.y)); and dist_2_nd_regbg=(abs(second_mv.x−regbg_mv.x)+ abs(second_mv.y−regbg_mv.y)).

The process then calculate a penalty for first MV or second MV depending upon which is closer to regional background MV. If (dist_1st_regbg<dist_2nd_regbg) that means first MV is closer to the regional background MV, then process increases the weightdist of first MV by reg_penalty_1st=max (0, min(63, dist2nd_regbg)−2*max(dist_1st_regbg, dist_2nd_regfg/4)). Otherwise, if the second MV is closer to regional background MV, the process will increase the weightdist of second MV by reg_penalty_2nd=max(0, min (63, dist_1st_regbg)−2*max(dist_2nd_regbg, dist_1st_regfg/4)). The above formula encourages the MV that is close to regional foreground MV and far from regional background MV.

After adding a penalty to the MV that is closer to the background regional MV, the process further checks whether a block in IMV is a foreground object by performing cover/uncover region analysis. For block A in IMV shown in FIG. 13, the process first selects from between the first MV and the second MV the one that is closer to the regional background MV as bgmv and the one closer to regional foreground MV as fgmv.

In normal mode, the process first hits from block A using fgmv to block B in P1Phase0MV, and then hits from block B using bgmv to block D in CFPhase1MV/CFPhase0MV and gets MV3, MV4. The process is similar at the other side and results in MV1, MV2 at block E in P1Phase0MV/P1Phase1MV.

Figure 13:
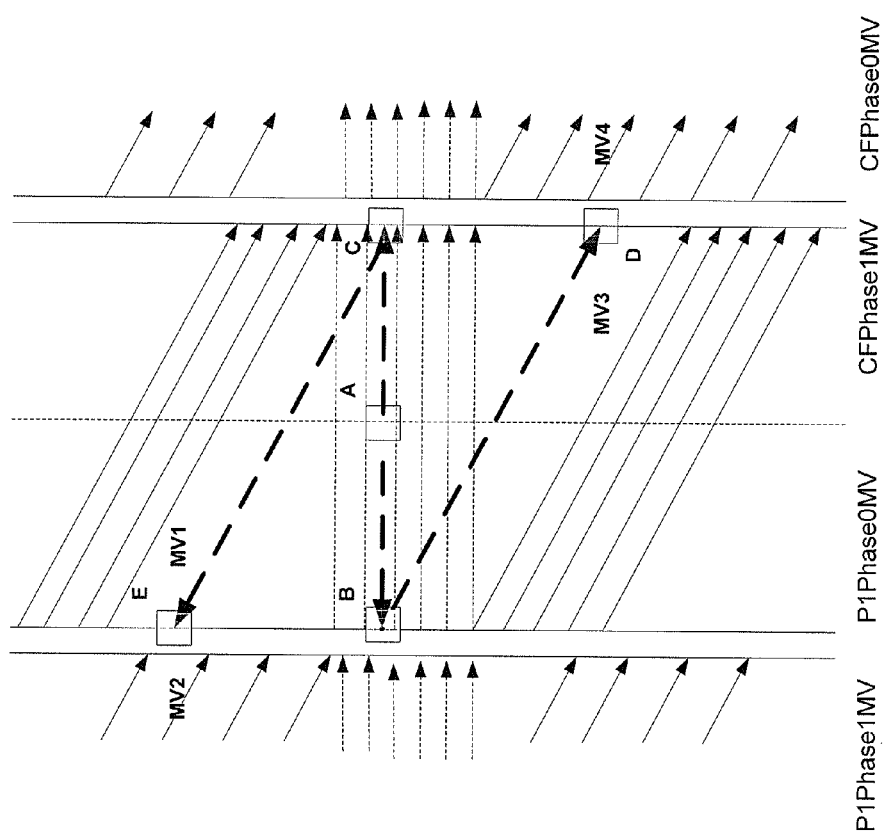
FIG. 13 shows a graphical representation of selection of background and foreground motion vectors.

After acquiring MV1-4 in FIG. 13, the process calculates the following penalty:

bgpen_pl=max(MV1.mvdiff:2*MV2.mvdiff, MV1.sad−2*MV2.sad); and bgpen_cf=max(MV3.mvdiff−2*MV4.mvdiff, MV3.sad−2*MV4.sad).

The large value of the bgpen_pl and bgpen_cf indicates that block D and block E is in cover/uncover region and block A is in foreground region. This results in increasing the weightdist of bgmv described above according to bgpen_pl and bgpen_cf value to encourage the foreground MV.

Figure 14:
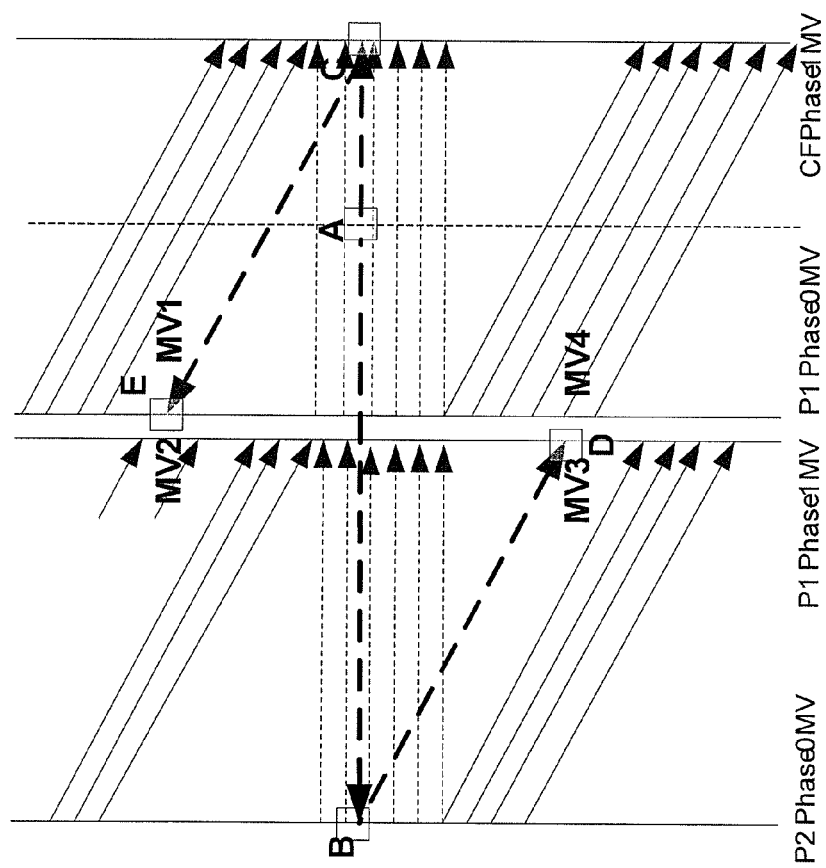
FIG. 14 shows a graphical representation of selection of background and foreground motion vectors in a low frame delay mode.
Figure 15:
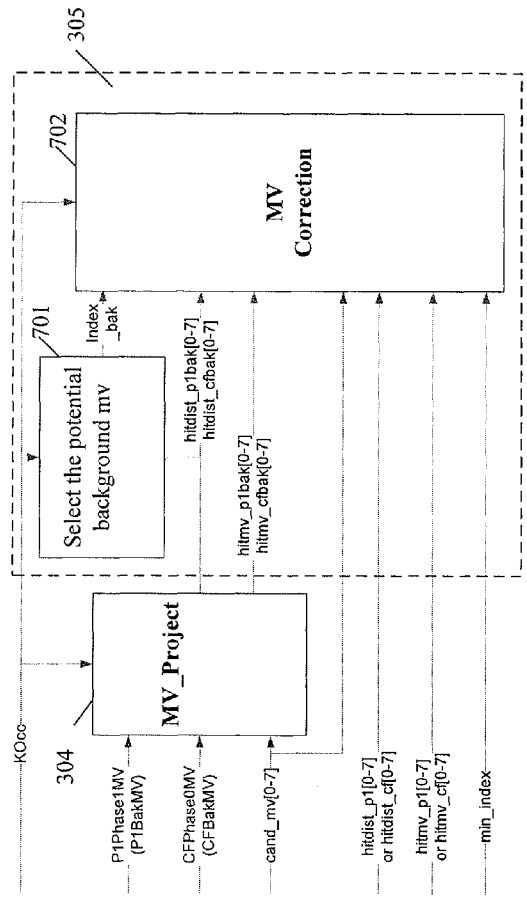
FIG. 15 shows an expanded embodiment of a motion vector correction module.

For low frame delay mode, the CFPhase0MV is not available, so the MV3 and MV4 should be obtained in a different way as shown in FIG. 14. In low frame delay mode, the process first hits from block A using fgmv to block B in P2Phase0MV, and then hits from block B using bgmv to block D in P1Phase1MV/P1Phase0MV and gets MV3, MV4. The following processes are the same as in the normal mode. After the above adjustment, the one with minimum weight-dist value will be selected as select_mv. The index for the selected MV is labeled as min_index.

To improve the MV quality in occluded region, module 305 from FIG. 3 does MV correction based on the hit MVs. Module 305 uses background MV from P1Phase1MV, when current block belongs to cover region, or from CFPhase1MV, when current block belongs to uncover region, to replace the current MV. Module 304 will project the eight candidate MVs to MV fields of P1Phase1MV and CFPhase0MV, and gets the hit MVs and hit distance.

Module 701 selects the potential background MV for MV correction in cover/uncover region. If current block belongs to a cover region (kocc>0), then the module selects the one which has the minimal hitdist_plbak as the potential background MV. Otherwise, if kocc<0, in normal mode the module selects the one which has the minimal histdist_cfbak as the potential background MV. In low frame delay mode, the module selects the one that is closest to the regional background MV as the potential background MV because the CFPhase0MV motion field is unavailable. The process labels the index for the potential background MV as index_bak.

Figure 16:
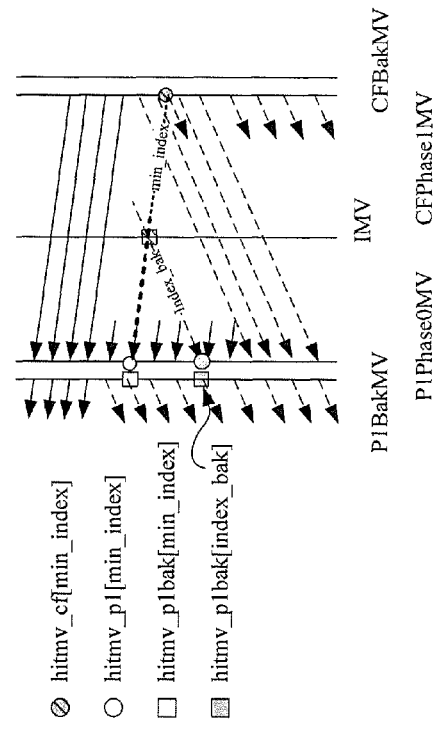
FIG. 16 shows a graphical representation of motion vector correction in a cover region.

Module 702 replaces the cand_mv[min_index] with cand_mv[index_bak] when current block belongs to cover/uncover region, as shown in FIG. 16 as MV correction in cover region (kocc>0). In an ideal cover region of FIG. 16, the module uses the background MV, either cand_mv[index_bak] or hitmv_plbak[index_bak], as the selected MV to do MV correction when following conditions are met. The MVs at the block hit by cand_mv[min_index] on P1BakMV hitmv_plbak[min_index] and CFPhase1MV hitmv_cf[min_index] are close to background MV, hitmv_plbak[index_bak]. Also, the hit MV on P1Phase0MV hitmv_pl[min_index] differs from those two MVs, hitmv_plbak[min_index] and hitmv_cf[min_index].

The other condition is that the mvdiff value of hitmv_plbak[min_index], hitmv_plbak[index_bak] and hitmv_cf[min_index] are all smaller than the mvdiff value of hitmv_pl[min_index]. This means that those MVs are more reliable than hitmv_pl[min_index].

Figure 17:
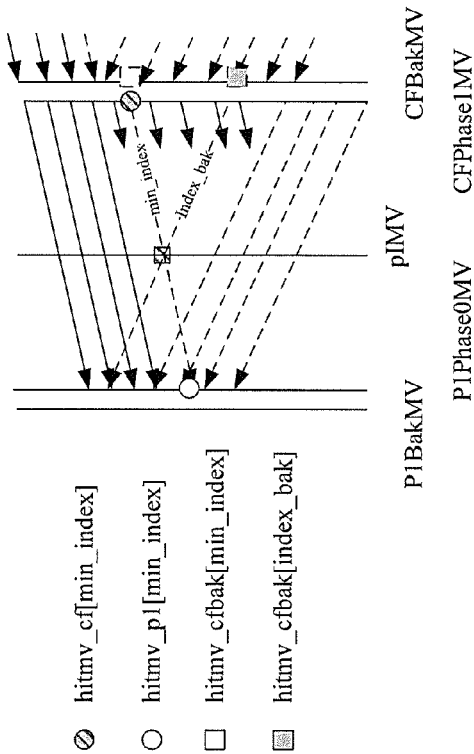
FIG. 17 shows a graphical representation of a motion vector correction in an uncover region.

In an ideal uncover region, shown in FIG. 17, the process uses the background MV (cand_mv[index_bak] or hitmv_cfbak[index_bak]) as the selected MV to do MV correction when the MVs at the block hit by cand_mv[min_index] on CFBakMV hitmv_cfbak[min_index] and P1Phase0MV hitmv_pl[min_index] are close to background MV hitmv_cfbak[index_bak]. The hit MV on CFPhase1MV hitmv_cf[min_index] differs from those two MVs hitmv_cfbak[min_index] and hitmv_pl[min_index].

The other condition is that the mvdiff value of hitmv_cfbak[min_index], hitmv_cfbak[index_bak] and hitmv_pl[min_index] are all smaller than the mvdiff value of hitmv_cf[min_index]. This means that those MVs are more reliable than hitmv_cf[min_index].

Figure 18:
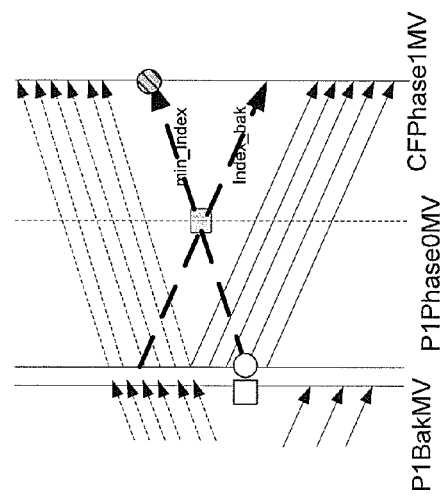
FIG. 18 shows a graphical representation of a motion vector correction in a uncover region in a low frame delay mode.

In the low frame delay mode for an ideal uncover region, CFPhase0MV is not available. The MV correction strategy for cover cases is the same, but the strategy for uncover cases is different as illustrated in FIG. 18. The process also uses the background MV cand_mv[index_bak] as the selected MV to do MV correction when following conditions are met:

hitdist_pl[min_index]>THR;
hitmv_pl[min_index] is closer to regional background MV than cand_mv[min_index]; and
Mvdiff value of hitmv_plbak[min_index] and hitmv_cf[min_index] are both larger than the mvdiff value of hitmv_pl[min_index].

Figure 19:
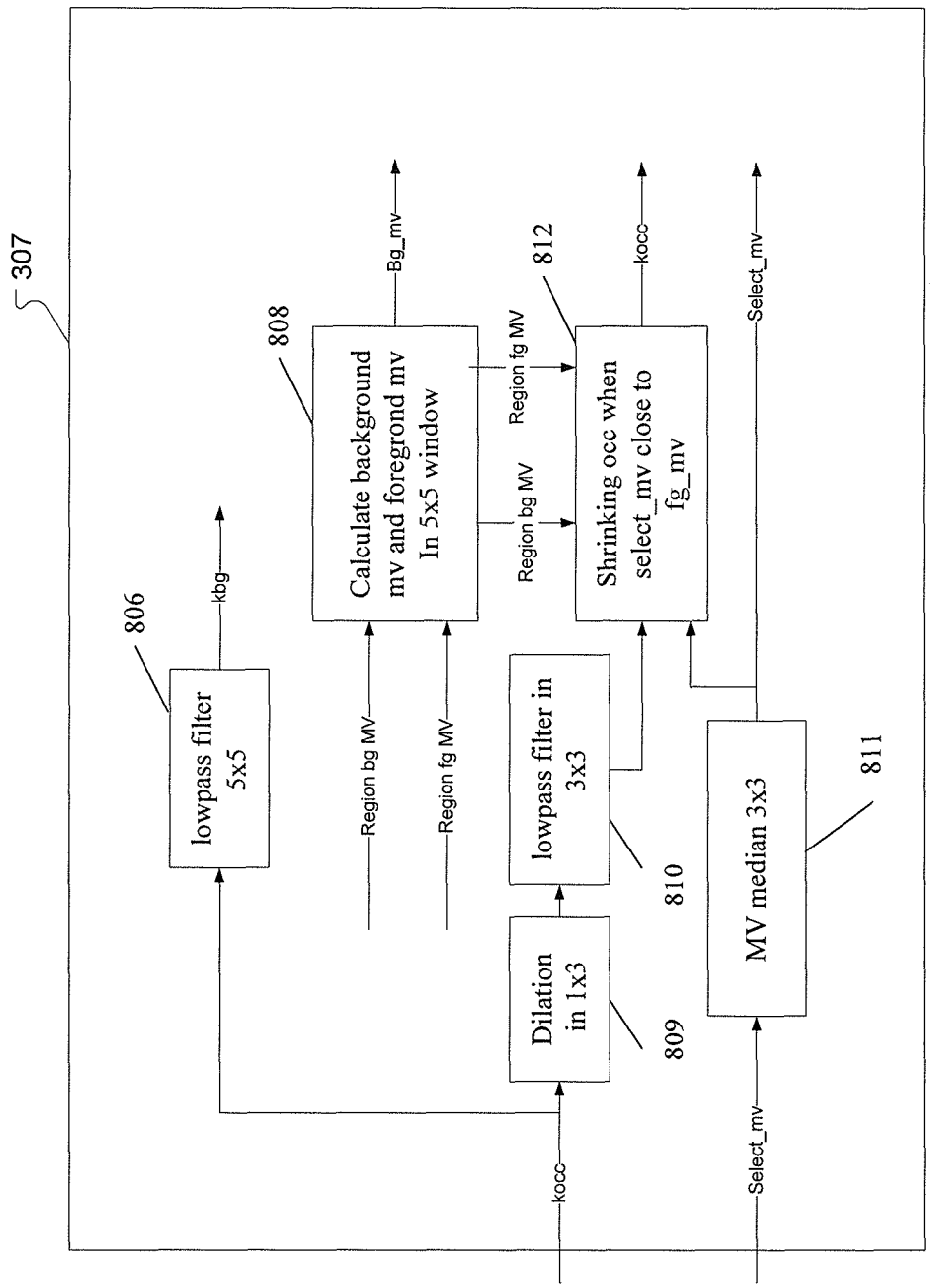
FIG. 19 shows an embodiment of a post processing module.

Some optional post processing modules may achieve better frame interpolation results as illustrated in FIG. 19. Module 806 low-pass filters the kocc value and gets the kbg value which will be regarded as confidence of background MV in frame interpolation.

Module 808 smoothes the background/foreground MV in a large window to make the result more stable. The module calculates the distance between each selected MV in a 5×5 window and the regional background/foreground MV. The module classifies them into two classes according to whether the MV is closer to regional background MV or regional foreground MV. Finally the module separately calculates the average value of the two classes as the smoothed background MV and foreground MV.

Module 809 and 310 do some operations to smooth the result of the kocc value. The kocc value was first enlarged with a 1×3 dilation operation, then low pass filtered by a 3×3 window.

Module 811 did median filtering in 3*3 window for the output MV of unstable blocks that have a large hit distance on P1 side or CF side. Module 812 refines kocc value according to the regional background and foreground MVs. If the selected MV is close to the regional foreground MV and far from regional background MV, the module will decrease its kocc value because a foreground block should not have kocc value.

After the above post-processing, the final output of module 307 includes select_mv, bg_mv, kocc and kbg. These outputs may be provided to a frame interpolation process such as that set out in U.S. patent application Ser. No. 12/970,822, "Frame Interpolation Using Pixel Adaptive Blending." The end result is a video display stream with a faster frame rate and higher number of frames than the original stream.

Thus, although there has been described to this point a particular embodiment for a method and apparatus for interpolating motion vectors for use in frame rate up conversion, it is not intended that such specific references be considered as limitations upon the scope of this invention except in-so-far as set forth in the following claims.

What is claimed is:

1. A method of performing motion compensation, comprising:
   dividing image data in a current frame and a previous frame into blocks of pixels;
   generating a set of motion vectors and block-level statistics for the blocks in the current frame and the previous frame;
   identifying a set of candidate motion vectors for each block in an intermediate frame from the set of motion vectors, using block-level data only from the previous frame and the current frame;
   performing block-level analysis of the statistics for each candidate motion vector from the set of candidate motion vectors for each block, wherein block-level analysis includes determining if any candidate motion vectors are approximately equal to other candidate motion vectors, and replacing one of the candidate motion vectors approximately equal to another candidate motion vector with a phase plane correlation motion vector;

selecting an interpolation motion vector for each block from the set of candidate motion vectors using results of the block-level analysis; and using the interpolation motion vector for each block to interpolate the block of the intermediate frame between the previous frame and the current frame, wherein a number of intermediate frames depends upon a conversion from a first frame rate to a faster frame rate.

2. The method of claim 1, wherein identifying the set of candidate motion vectors comprises selecting motion vectors from a region around the current block in the interpolated frame.

3. The method of claim 1, wherein identifying the set of candidate motion vectors comprises including at least one phase plane correlation generated motion vector.

4. The method of claim 1, wherein selecting an interpolation motion vector comprises selecting a candidate motion vector with a minimal difference to a motion vector from the set of motion vectors from the previous frame and the current frame.

5. The method of claim 4, wherein selecting a candidate motion vector with a minimal difference comprises selecting a candidate motion vector that has a minimal hit distance between a projection of the candidate motion vector to a block in adjacent frames and a motion vector for the block, wherein the adjacent frames consist of the current frame and the previous frame.

6. The method of claim 5, wherein the hit distance includes distances from both adjacent frames.

7. The method of claim 5, wherein the hit distance includes a sum of absolute differences derived for the block.

8. The method of claim 5, wherein the motion vector for the block is derived from motion vectors for four closest blocks to the where the selected motion vector hits the previous or current frame.

9. The method of claim 1, further comprising selecting a second interpolation motion vector.

10. The method of claim 9, further comprising determining which of the interpolation motion vector and the second interpolation motion vector is closer to a background motion vector.

11. The method of claim 10, further comprising determining if the interpolated block is in a cover/uncover region, and if the block is not in the cover/uncover region, increasing a hit distance for the labeled background motion vector.

12. The method of claim 11, further comprising replacing the interpolation motion vector with one of either a motion vector from the cover/uncover region or an additional motion vector if the motion vector from the cover/uncover region is more reliable.

13. The method of claim 10, wherein labeling as a background motion vector comprises:

comparing a motion vector for the interpolated block that points back to the previous frame and a motion vector for the interpolated block that points forward to the current frame to find a difference between them; and labeling one of the two motion vectors as the background motion vector depending upon the difference.

14. The method of claim 13, further comprising determining a stability of the background motion vector.

15. The method of claim 14, wherein the interpolated block is labeled to indicate whether the block has a stable background or foreground motion vector.

16. A method of determining background and foreground motion vectors for a block in an interpolated frame, comprising:

comparing a first motion vector for the block in the interpolated frame that points to a previous frame to the interpolated frame to a second motion vector that points to a next frame to the interpolated frame to produce a difference, wherein the first and second motion vectors are derived only from data in the previous and next frames;

designating one of the first and second motion vectors as a background motion vector and the other as a foreground motion vector depending upon the difference;

using the background motion vector and the foreground motion vector to select a motion vector for the block;

dividing the interpolated frame into regions comprised of at least portions of several blocks and the analyzing the foreground and background motion vectors for each block in the interpolated frame to provide regional background and foreground motion vectors; and storing the background motion vector and the foreground motion vector for the block with a designation for the block.

17. The method of claim 16, further comprising:

determining a stability of the background and foreground motion vectors by projecting the background and foreground motion vectors to the previous frame and the next frame;

calculating the difference between the projections; and comparing the difference to a threshold such that if the difference is less than a threshold, the background and foreground vectors are stable.

18. The method of claim 17, wherein the block is labeled to indicate the stability of the foreground and background motion vectors.

19. The method of claim 16, wherein the regions overlap.

20. The method of claim 16, wherein analyzing the foreground and background motion vectors for each block comprises taking an average of foreground and background motion vectors for blocks having stable foreground and background motion vectors.

21. The method of claim 20, wherein the average is a weighted average.

22. The method of claim 21, wherein the weighted average is based on the stability of the block motion vectors.

23. The method of claim 20, wherein the weighted average is based only on stable foreground and background motion vectors.

* * * * *